Nov. 24, 1959  H. ST. PIERRE  2,914,023
ANIMAL FEEDER CONSTRUCTION
Filed Nov. 19, 1956  2 Sheets-Sheet 1

INVENTOR
HENRY ST. PIERRE
BY Charles R. Fay
ATTORNEY

Nov. 24, 1959                H. ST. PIERRE                2,914,023
ANIMAL FEEDER CONSTRUCTION
Filed Nov. 19, 1956                                        2 Sheets-Sheet 2
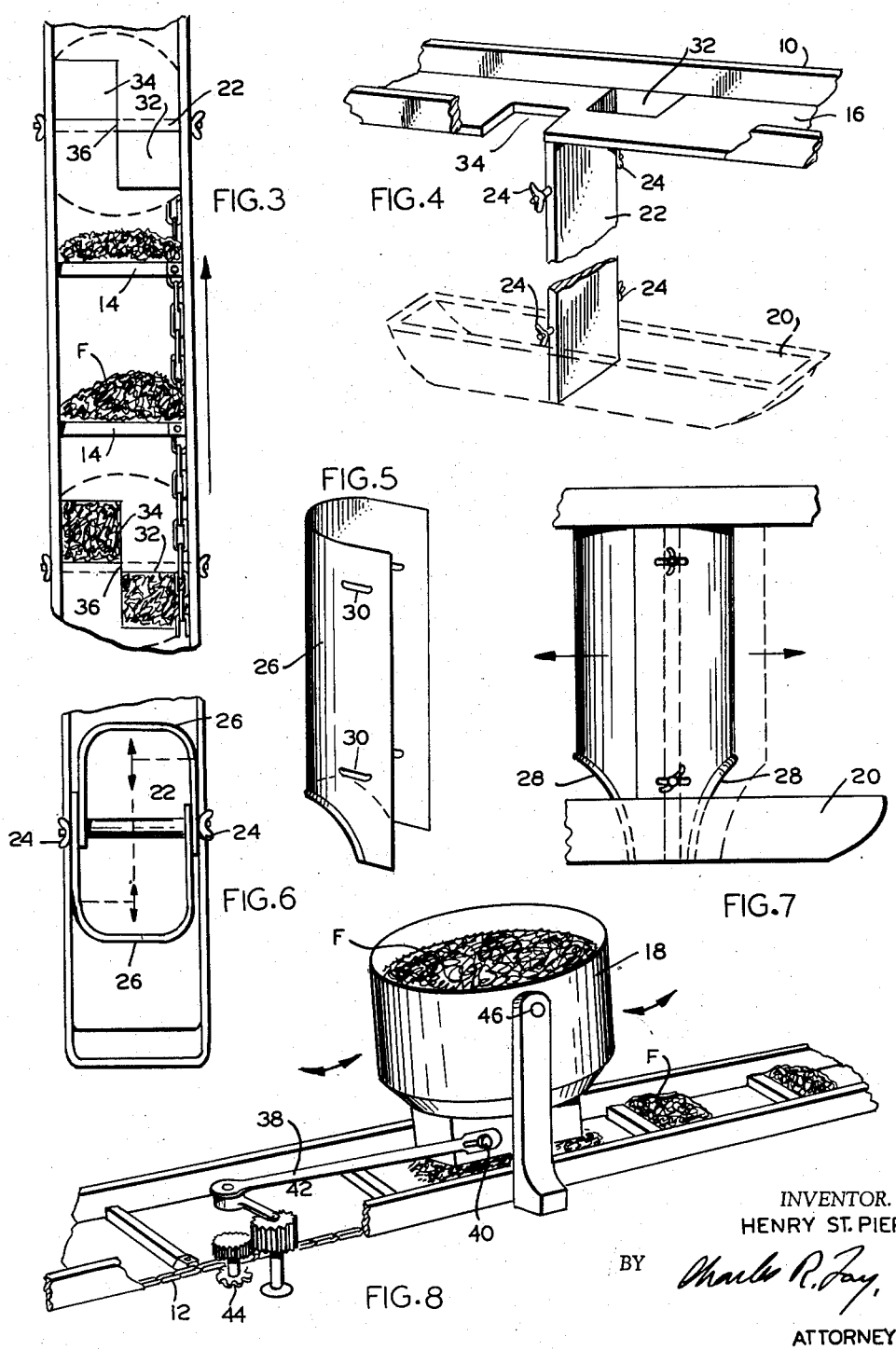
INVENTOR.
HENRY ST. PIERRE
BY
ATTORNEY

United States Patent Office 2,914,023
Patented Nov. 24, 1959

2,914,023

ANIMAL FEEDER CONSTRUCTION

Henry St. Pierre, Worcester, Mass.

Application November 19, 1956, Serial No. 623,173

7 Claims. (Cl. 119—52)

This invention relates to a new and improved animal feeder construction particularly adapted for dairy cattle and the like wherein the animals are usually housed or situated in rows in a barn or stable. The principal object of the present invention is to provide a measured quantity of a specific type of feed to be delivered to each animal, so that each animal gets the right amount of feed and no more or no less; the provision of a power-operated continuous feeder including a channel located above the row or rows of animals in a continuous loop or form, said channel being provided with a power-driven chain and the chain being provided with flights for moving the feed along the channel from a hopper, said channel being provided with down spouts arranged conveniently at intervals, such down spouts being adjustable in size to adjust the bulk received therein and having their lower ends closed as for instance by a feeding trough or basin and the down spouts each being provided with a lateral orifice discharging the feed into the basin; the provision of an animal feeder as above described wherein the down spouts are adjustable and are double in nature having a dividing supporting partition with reference to which the down spouts may be bodily laterally moved to adjust the section thereof providing for different amounts of feed to be contained therein whereby the animal feed may be reasonably accurately controlled as above stated.

A further object of the invention resides in the provision of a comminuted mixture of hay and ensilage thoroughly mixed, which being in comminuted form is easily fed along in the feed trough by the flights and easily deposited in the down spouts described above, so that the animals are provided with a balanced diet containing the desired amount of protein and at the same time the hay is provided in such a form as to allow the same to be fed or dropped into the down spouts without sticking or obscuring or blocking the down spouts.

Other objects and advantages of the invention will appear hereinafter.

Reference is to be had to the accompanying drawings, in which—

Fig. 3 is a plan view on an enlarged scale illustrating the channel;

Fig. 4 is a perspective view illustrating the construction of the channel with relation to the supporting means for the down spouts;

Fig. 5 is a perspective view of a single down spout;

Fig. 6 is a top plan view of a double down spout;

Fig. 7 is a view in front elevation showing how the down spouts may be adjusted; and Fig. 8 is a perspective view illustrating an oscillating device for the feed hopper.

Figure 2:
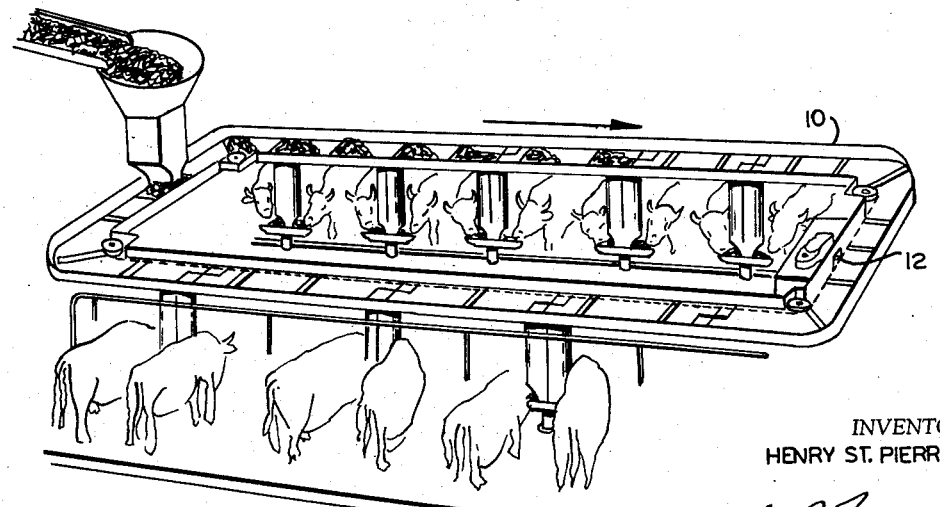
Fig. 2 is a perspective view on a smaller scale showing the continuous feed channel and the food moving chain therein.

Appropriately arranged and supported in any manner desired, this invention provides a trough or channel generally indicated by the reference numeral 10, which channel may be continuous in form as illustrated in Fig. 2 and provided with an endless belt or chain 12 which is power-driven therein, moving in the direction of the various rolls a series of parallel spaced flights 14. These flights move along the interior surface 16 of the channel 10 and are adapted to push feed along the channel for distribution to the animals below as will be hereinafter described.

Fig. 2 shows a hopper which is generally indicated at 18 and comminuted ensilage and hay in mixed form is transferred thereby from a source of supply into the channel or trough 10. As will be clear, the chain-driven flights 14 will move this material along the trough and being in a closed circuit, will return to initial position for further loads of the feed. The chain 12 is adapted to be power-driven as by an electric motor or the like which may be controlled in the ordinary manner by a manual switch, or it may be controlled for operation while the operator is absent by means of a time clock, if desired.

Figure 1:
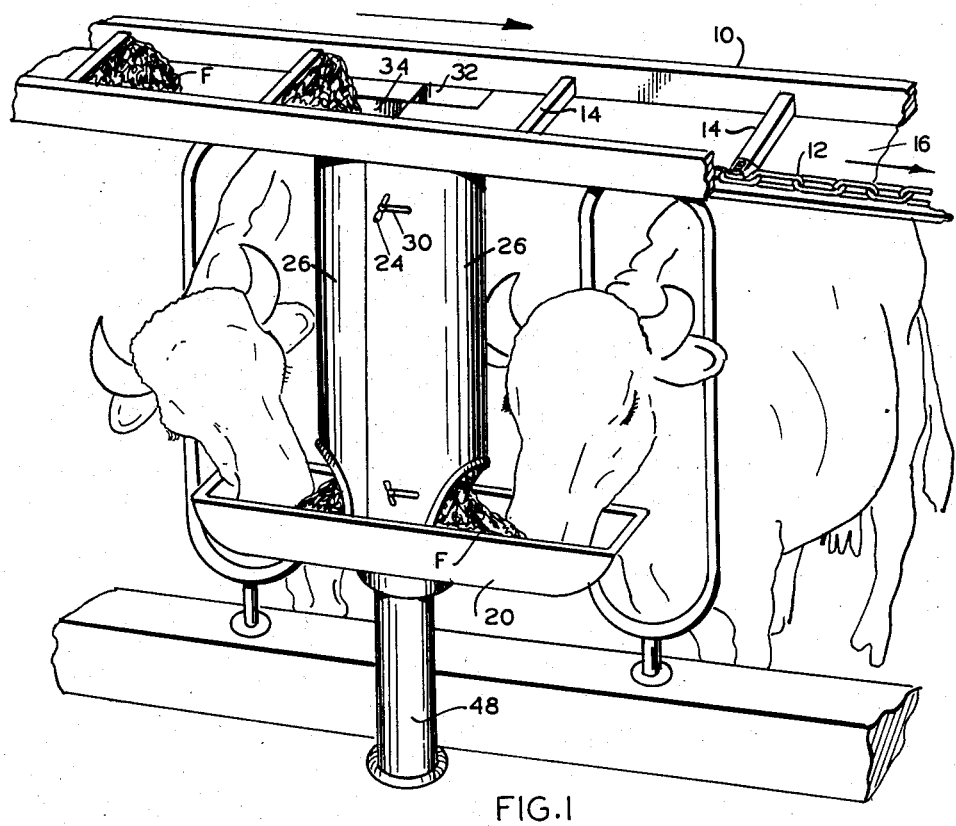
Fig. 1 is a perspective view illustrating the invention.

Between each pair of animals which are housed as shown in Figs. 1 and 2, there is provided a pair of down spouts for leading the feed indicated at F to feeding troughs or basins indicated at 20. Each down spout finds a support on a plank or partition 22 which may be secured in any way desired, as for instance to the bottom of the trough itself. Thumb nuts as indicated at 24 are convenient means for adjustably securing the down spouts which are indicated at 26 and each down spout may be conveniently made of sheet metal bent to a U-form, see particularly Figs. 5 and 6. There is one of these down spouts arranged at each side of each partition 22, see Figs. 6 and 7, and the left-hand one shown in Fig. 5 is duplicated at the right-hand side but with the feed opening indicated at 28 reversed. The thumb nuts are used to secure the down spouts in adjusted position relative to the slots 30, and it will be seen that the suction and volume of each down spout is easily individually adjusted by first loosening the respective thumb nuts, adjusting the down spout relative to the supporting partition 22 and resecuring the thumb nuts. As shown in Fig. 1, the down spouts are shown at their largest capacity.

The floor of the trough 10 is provided with offset feed openings indicated at 32 and 34. These openings are offset, and lie respectively at opposite sides of a center line of the trough, so that the feed being moved along by the flights 14 is equally received in the respective pairs of openings 32 and 34 while the rigidity of the troughs itself is maintained, and it will be noted that the supporting partition 22 is located directly under the web 36 that separates the respective openings 32 and 34.

The feed trough or basin 20 is provided with sides and ends so as to prevent the feed from dropping on the ground and this provides the animal with opportunity for consuming the feed without dropping or dirtying the same. The openings 28 are made with protective rims as clearly shown, and the animals are enabled to lick out any feed remaining within the area of the down spouts.

The hopper 18 may be oscillated by a bar 38 attached thereto as at 40 and operated by a crank 40, in turn operated by a pinion and sprocket 44 rotated by the passage of the chain 12. The hopper 18 may be mounted on brackets which are pivoted at 46 and thus as the chain progresses, the bar 38 will cause the hopper to be jostled preventing any sticking of the feed in the hopper.

When the feed is located in the trough, it will be moved along by the flights 14 as described, and when the first pair of down spouts are filled with the comminuted ensilage and hay, the feed progresses to the next pair and so on along the entire line of animals. In the operation of the device, it is preferred to provide a slight excess of feed over that which is estimated to be needed, so as to ensure that the last down spout to be filled shall receive their full complement of feed inasmuch as the ultimate down spout will not be reached until the first pair of animals to be served have received at least a small amount of the feed in their next particular down spout.

Any manner of supporting the feed troughs or basins 20 and the partitions 22 may be utilized and that here shown resides in a column of any desired construction illustrated at 48.

Having thus described my invention and the advantages thereof, I do not wish to be limited to the details herein disclosed, otherwise than as set forth in the claims, but what I claim is:

1. Animal feeder construction comprising a trough, means to support the same, an overhead elongated trough, a hopper for receiving feed, said hopper directing the feed to the overhead trough, a conveyor in the overhead trough distributing the feed therein, at least one arcuately shaped, vertically disposed feed spout having upper and lower ends and a side portion, the lower end of the spout having a feed-releasing opening, said opening including the adjacent part of the side portion of the spout, said lower spout end resting in said first-named trough so that the feed is deposited in the latter, the upper end of the spout being in feed-receiving contact with the elongated trough to receive feed distributed by the conveyor.

2. The animal feeder construction of claim 1 wherein the spout comprises a pair of separate, upright arcuate parts and including means to adjustably secure the same together in relatively horizontal adjusted position to vary the volume of the spout.

3. The animal feeder construction of claim 1 wherein the spout comprises a pair of separate, upright arcuate parts and including means to adjustably secure the same together in relatively horizontal adjusted position to vary the volume of the spout, and a vertical partition in the spout separating the same into two parts, each communicating separately with the first-named trough at separate points therein, and each part having a separate feed releasing opening.

4. The animal feeder construction of claim 1 wherein the spout comprises a pair of separate, upright arcuate parts and including means to adjustably secure the same together in relatively horizontal adjusted position to vary the volume of the spout, a vertical partition in the spout forming a pair of feed-conducting members, said opening being in one member, and there being a like opening in the other member at a like location therein.

5. The construction of claim 1 including an agitator for the hopper comprising a chain, means to travel the chain, a pivot support for the hopper, a crank attached to the hopper to agitate the same, and means actuated by the chain to operate the crank.

6. The construction of claim 1 wherein the conveyor comprises a chain, means to travel the chain, a series of cleats on the chain arranged normal thereto, said cleats sweeping the elongated trough and distributing the feed, and an opening in the bottom of the elongated trough over the spout.

7. Animal feeder construction comprising a trough, means to support the same, an overhead elongated trough, a hopper for receiving feed, said hopper directing the feed to the overhead trough, a conveyor in the overhead trough distributing the feed therein, at least one arcuately shaped, vertically disposed feed spout having upper and lower ends and a side portion, the lower end of the spout having feed releasing openings, said openings including the adjacent part of the side portion of the spout, said lower spout end resting in said first-named trough so that the feed is deposited in the latter, the upper end of the spout being in feed-receiving contact with the elongated trough to receive feed distributed by the conveyor, a vertical partition in the spout dividing the same into two parts, said openings being located at opposite sides of the partition, there being an opening for each spout part, openings in the bottom of the overhead trough, each of said trough openings being aligned with one spout part, said trough openings being mutually offset laterally as regards the direction of feed in the overhead trough, said conveyor causing deposition of feed through each trough opening substantially equally, said conveyor including cleats sweeping the trough bottom and each cleat passing over both of the offset trough openings.

References Cited in the file of this patent

UNITED STATES PATENTS

| 2,081,947 | McCornack | June 1, 1937 |
| 2,308,735 | Zann | Jan. 19, 1943 |
| 2,681,639 | Littlefield | June 22, 1954 |
| 2,681,746 | Hawkins et al. | June 22, 1954 |
| 2,706,581 | Albers | Apr. 19, 1955 |
| 2,747,546 | Winter | May 29, 1956 |
| 2,786,447 | Murray | Mar. 26, 1957 |

OTHER REFERENCES

Country Gentleman Magazine, February 1954, pp. 40 and 41.